United States Patent [19]

Iwai et al.

[11] 4,392,536
[45] Jul. 12, 1983

[54] VEHICLE

[75] Inventors: Kazuhiro Iwai, Iruma; Hiroshi Enomoto, Oimachi; Akito Enokimoto, Asaka; Yoshitaka Kato, Wako, all of Japan

[73] Assignee: Honda Giken Kogyo Kabushiki Kaisha, Tokyo, Japan

[21] Appl. No.: 232,434

[22] Filed: Feb. 9, 1981

[30] Foreign Application Priority Data

Feb. 14, 1980 [JP] Japan .................................. 55-17130
Feb. 19, 1980 [JP] Japan ............................. 55-20159[U]

[51] Int. Cl.$^3$ ........................ B62K 11/02; B62K 25/04
[52] U.S. Cl. .................................... 180/217; 180/227; 280/282; 280/284
[58] Field of Search ............... 180/217, 215, 210, 227; 280/282, 283, 284

[56] References Cited

U.S. PATENT DOCUMENTS

| | | | |
|---|---|---|---|
| 3,811,528 | 5/1974 | Hooper | 180/227 |
| 4,191,269 | 3/1980 | Nagashima et al. | 280/282 |
| 4,322,088 | 3/1982 | Miyakoshi et al. | 280/284 |
| 4,325,449 | 4/1982 | D'Addio et al. | 280/284 |

Primary Examiner—Joseph F. Peters, Jr.
Assistant Examiner—Donn McGiehan
Attorney, Agent, or Firm—Irving M. Weiner; Pamela S. Burt; John L. Shortley

[57] ABSTRACT

A vehicle with at least one front wheel and two rear wheels comprises a rear cushion unit for use in damping repelling forces from the ground surface and other vibratory forces developed by chain driving and the like. The upper end of the rear cushion unit is supported at a position axially rearward of a main frame member of a frame structure, while the lower end thereof is supported at a position forward of a rear axle bearing member. On each side of the rear axle bearing member there is mounted either a sprocket wheel or a braking device. A chain adjustment mechanism of the rear wheel assembly is constructed in such a manner that the front end of the swing arm is pivotally connected to the frame structure via elongated holes located in a lower portion of the frame structure, the elongated holes allowing the front end of the swing arm to be adjustable in position in the longitudinal direction, so that the rear wheel assembly comprising the rear axle bearing member, a rear axle and the rear wheels is adjustable in position in the longitudinal direction.

10 Claims, 12 Drawing Figures

VEHICLE

BACKGROUND OF THE INVENTION

1. Field of the Invention

The present invention relates to a vehicle with at least one front wheel and two rear wheels and more particularly relates to an improved power driven vehicle with at least one front wheel and two rear wheels which is very suitable for travelling on rough or unpaved roads, terrain or the like.

2. Description of the Prior Art

Tricycles equipped with balloon tires for rough or unpaved roads and terrain have been heretofore proposed and some are in practical use. However, in order to meet current demands that both the frame structure and the suspension mechanism be constructed with a simple structure for reducing their weight and that the suspension mechanism be easy to mount on the frame structure, it is preferable that the carrying or supporting mechanism for the rear wheel assembly be improved and simplified.

Further, since the vehicle with two rear wheels is constructed in a manner differing from the conventional power driven bicycle, such that a rear axle is directly rotated for driving the rear wheels, the braking device should be desirably arranged in the rear wheel assembly.

SUMMARY OF THE INVENTION

In order to obviate the drawbacks attendant the conventional vehicle with two balloon-type rear wheels, such as a tricycle for travelling on rough or unpaved roads and terrain as described above, a variety of research and development has been performed to arrive at the present invention.

Thus, it is a principal object of the present invention to provide a vehicle with at least one front wheel and two rear wheels, such as a tricycle, which has an improved rear wheel suspension mechanism of a shock absorbing type with a simplified structure and which is reliable and effective in function with excellent mechanical strength and rigidity, and moreover requires a minimal number of parts and elements.

It is another object of the present invention to provide a vehicle having at least one front wheel and two rear wheels with an improved rear wheel suspension mechanism which is provided with a driving device as well as a braking device, both of which are efficiently arranged within a limited space in the suspension mechanism.

It is another object of the present invention to provide a vehicle with at least one front wheel and two rear wheels which is constructed such that an axle of the rear wheels is driven by means of a chain line and in which a chain adjustment mechanism is incorporated, the chain adjustment mechanism permitting easy adjustment to minimize maintenance service and being provided on the side of a vehicle body for substantial reduction in spring-supported weight and remarkably improved travelling comfort.

Other objects and advantageous features of the present invention will become apparent from the following detailed description, when read in conjunction with the accompanying drawings which illustrate preferred embodiments of the invention.

BRIEF DESCRIPTION OF THE DRAWINGS

FIGS. 10 to 12 are outline drawings of the tricycle in accordance with the first embodiment, wherein FIG. 10 is a front view.

DETAILED DESCRIPTION OF THE PREFERRED EMBODIMENTS OF THE INVENTION

Figure 1:
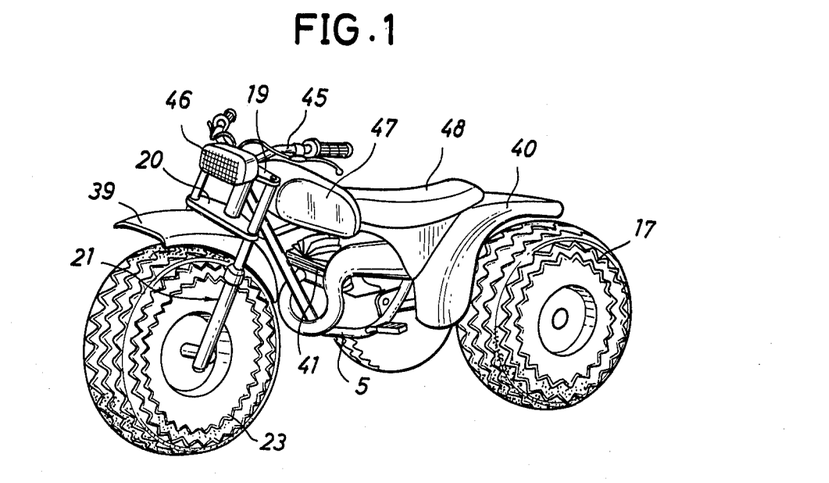
FIG. 1 is a perspective view schematically a tricycle in accordance with a first embodiment of the present invention.
Figure 2:
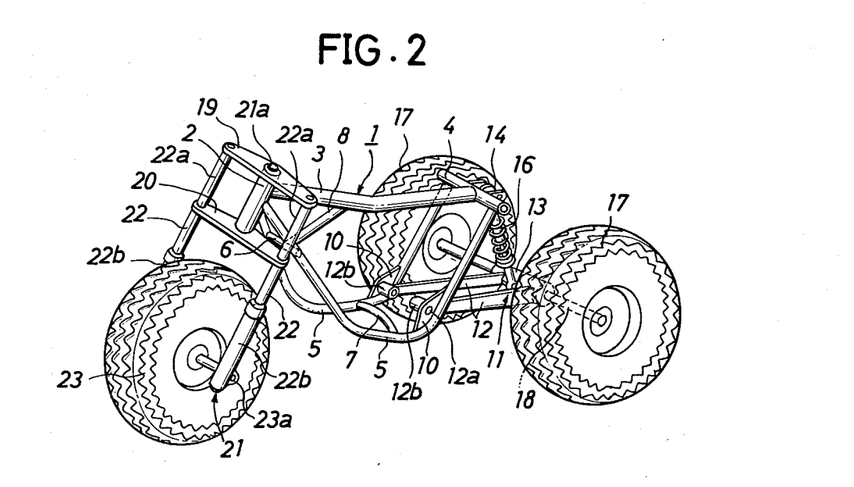
FIG. 2 is a perspective view of a frame structure of the tricycle of FIG. 1.
Figure 3:
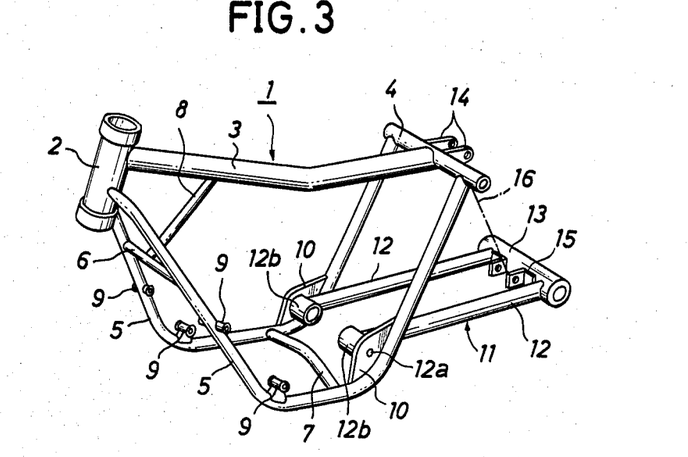
FIG. 3 is a perspective view of the frame structure of FIG. 2, shown in an enlarged scale.
Figure 4:
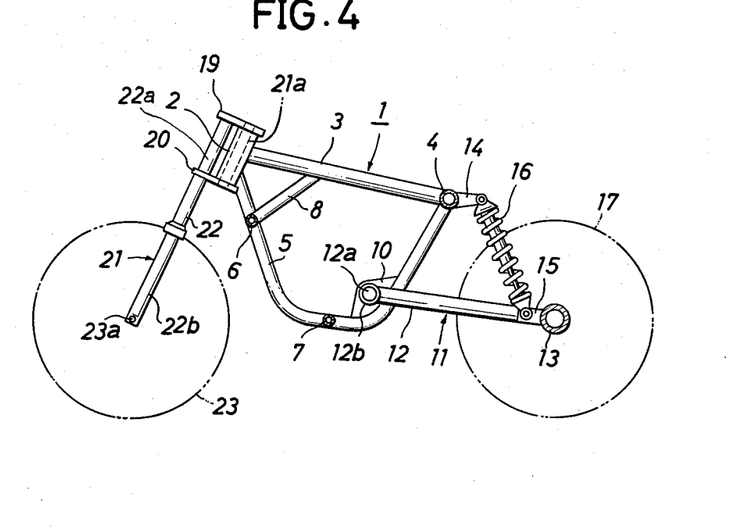
FIG. 4 is a side view of the frame structure of the tricycle of FIG. 1, wherein the front and rear wheels are shown in dotted lines.

FIGS. 2 and 3 illustrate a frame structure 1 for a tricycle in accordance with the present invention. Specifically, the frame structure 1 includes a head tube 2 at its front part, the head tube 2 extending vertically with a substantial rearward inclination. Further, the frame structure 1 includes a main frame member 3 of the so-called "backbone pipe" type, said main frame member 3 being connected to the upper part of the rear face of the head tube 2 and extending in the rearward direction. At the rear end of the main frame member 3, there is provided a transversely extending cross member 4 which is connected to the rear end of the main frame member 3 at its middle part. From the head tube 2, a pair of down tubes 5 connected to the lower part of the head tube 2 first extend in respective rearwardly downward directions, next in respective rearward directions and then in respective upwardly rearward directions, as illustrated in FIGS. 2 and 3. A rear upper end of each down tube 5 is connected to the cross member 4 proximal to either end of the latter. Thus, the frame structure 1 is constructed in the form of a cradle. In this connection it is to be noted that between down tubes 5 at the fore part of the frame structure is provided a transversely extending sub-cross member 6, between the down tubes 5 at the rear part of the frame structure is provided another transversely extending sub-cross member 7 in the same manner as the sub-cross member 6, and between the sub-cross member 6 and the main frame member 3 is provided a reinforcement member 8. Further, the down tubes 5 are fitted with a plurality of support brackets 9 which are disposed in position for mounting an engine (not shown) thereon.

The down tubes 5 are further fitted with a pair of brackets 10, each being disposed at the lower part of an L-shaped bent portion of either down tube 5. To the brackets 10 are pivotally secured a pair of members 12 for a rear fork in the form of a swing arm generally designated by the reference numeral 11, the members 12 being pivotally supported on the brackets 10 by means of shafts 12a and collars 12b. The members 12 are provided with a bearing member 13 at their rear ends which extends transversely to bear a rear axle 18 therein. As shown in FIG. 3, the member 13 is in the form of a pipe and the arm members 12 are connected to one another at the rear ends thereof by way of the transversely extending bearing member 13.

To the middle part of the cross member 4 disposed at the rear end of the main frame member 3 is fixedly secured a bracket 14 in the form of a fork extending horizontally behind the main frame member 3. Between the members 12 of the swing arm 11, at the middle part of the rear axle bearing member 13, is arranged another bracket 15 which extends horizontally from the rear axle bearing member 13 in the forward direction, said bracket 15 being designed in the form of a fork. As illustrated in FIG. 2, a rear cushion unit 16 extends diagonally between the brackets 14 and 15, one end of the unit 16 being pivotally connected to the upper bracket 14, while the other end thereof is pivotally connected to the lower bracket 15, thus providing an effective suspension between the frame 1 and the swing arm 11. It should be noted that the rear axle bearing member 13 of the swing arm 11 has its center suspended in position behind the main frame member 3 by means of the single rear cushion unit 16.

The rear axle 18 of a pair of rear wheels 17 extends transversely through the rear axle bearing member 13 such that the rear axle 18 is rotably supported therein, the rear wheels 17 being fixedly secured to both ends of the rear shaft 18.

In the above-described arrangement, reaction from the ground surface is transmitted to the rear axle bearing member 13 of the swing arm 11 via the rear wheels 17 and the rear shaft 18, causing the swing arm 11 to swing about the front ends of the members 12 so as to compress or expand the rear cushion unit 16. Thus, swinging movement of the swing arm 11 is effectively damped. Further, the load imparted to the rear cushion unit 16 is transmitted to the main frame member 3 via the cross member 4 in the axial direction of the main frame member 3, more particularly, in the axial direction of the backbone pipe of the frame structure. Due to the fact that the load is transmitted to and supported by the main frame member 3 which has the greatest diameter of the relevant members in the frame structure, and thus has excellent mechanical strength and rigidity, the load will have a minimized effect on the other members and thereby the latter may be designed with smaller diameters. Further, due to the fact that the load is supported in the axial direction of the main frame member 3 and at the same time the rear cushion unit 16 is supported at the center of the rear axle bearing member 13, the load is supported in an effective and satisfactory manner by only a single rear cushion unit. Thus, the frame structure requires a minimal number of parts including support brackets for the rear cushion unit.

As illustrated in FIG. 2, the head tube 2 has a steering shaft 21a freely fitted therein, the steering shaft 21a having upper and lower bridges 19 and 20 fixedly secured thereto at the upper and lower ends of the head tube 2. The upper and lower bridges 19 and 20 hold a pair of upper portions 22a of a pair of upper members 22 of a telescopic front fork 21, each upper portion 22a vertically extending between the bridges 19 and 20 on either side thereof and being fixedly secured thereto. Further, the front fork includes a pair of lower members 22b, in the form of a bottom case, which fit over the upper members 22. A single front wheel 23 is supported by means of a front axle which transversely extends between the lower ends of the lower members 22b.

In the arrangement as described above the front wheel 23 is resiliently supported. Thus, repelling forces from the ground surface to the front wheel 23 are damped in the same manner as the conventional bicycle. The resulting load is transmitted to the main frame member 3 via the head tube 2. Thus, the load from the front wheel 23 as well as that from the rear wheels 17 via the rear cushion unit 16 is effectively supported by means of the main frame member 3 of high rigidity.

Figure 5:
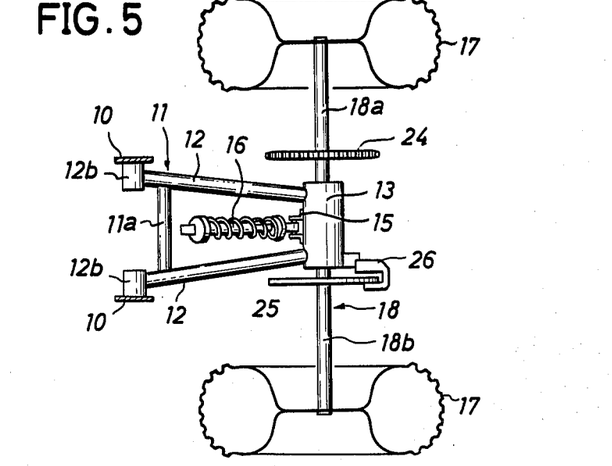
FIG. 5 is a partial plan view of a rear wheel assembly of the tricycle.

FIG. 5 is a partial plan view which clearly illustrates the manner in which the rear wheels 17 are resiliently suspended. Specifically, the rear axle 18 is extended through and rotatably supported by the bearing member 13 to which the members 12 of the swing arm 11 are connected at their rear ends, the bearing member 13 having mounted thereon the lower support bracket 15 for the rear cushion unit 16 which is protruded forwardly from the member 13. The rear axle 18 has extensions 18a and 18b on the respective sides of the bearing member 13, the outer ends of which are connected to the rear wheels 17. Further, the extension 18a of the rear axle 18 has a sprocket wheel 24 fixedly mounted thereon proximal one end of the bearing member 13, the sprocket wheel 24 being operatively connected with a power output portion of an engine transmission case via a chain-sprocket mechanism, whereby the rear axle 18 is driven by the engine. On the other hand, the other extension 18b of the rear axle 18 has a brake disc 25 fixedly mounted thereon proximal the other end of the bearing member 13, the brake disc 25 comprising part of a braking device of the disc type in the illustrated embodiment, whereby the rear axle 18 can be braked by means of the braking device with the disc 25 and a caliper 26 which is adapted to clamp the former.

As described above, the lower end of the rear cushion unit 16 is connected to the rear axle bearing member 13 in a position forwardly of the same, i.e., forwardly of the rear axle 18. This arrangement allows the stroke of the rear cushion unit 16, which comprises a hydraulic damper, to be shorter during damping operation than that of the axle 18 toward the cross member 4 caused by the swinging movement of the rear axle 18. Thus, the piston in the rear cushion unit 16 has a reduced displacement, heating is minimized, damping properties have less fluctuation even when travelling on rough and unpaved roads for a long period of time, and constant comfort is achieved during travelling. Further, due to the fact that the rear cushion unit 16 is disposed in alignment with the center line of the vehicle, distortion or like deformation is reduced as far as possible and stability and durability are improved.

As described above, the swing arm 11 is constructed such that both of the members 12 extend horizontally rearwardly from the frame 1 with their front ends being pivotally connected to the frame structure, while their rear ends are connected to the rear axle bearing member 13 in the form of a cross member through which the rear axle 18 extends to carry the rear wheels 17 at the outer ends thereof. Thus, the swing arm 11 forms a U-shaped semi-closed structure, seen from above. This allows the swing arm 11 for carrying the rear wheels 17 to have improved mechanical strength and rigidity. Moreover, repelling froces from the ground surface, repelling forces from the rear cushion unit and the like are satisfactorily supported by the swing arm 11, resulting in substantially reduced dimensions and weight of the swing arm 11 with sufficient mechanical strength and rigidity maintained. Alternatively, an additional cross member 11a (FIG. 5) may be provided between the members 12 at the fore ends thereof so that the swing arm 11 is constructed to form a fully closed structure due to the fact that the members 12 are connected to one another at both the front and rear ends by way of the transverse members 11a and 13. As a result, the swing arm has a highly increased mechanical strength and rigidity.

It is to be noted that a wheel driving member or the sprocket 24 and braking members or the brake disc 25 and caliper 26 are disposed in spaced or distributed relation with respect to the rear axle bearing member 13 and such members are mounted on a single shaft or the axle 18 without any necessity of their direct mounting onto respective rear wheels, with the result that the driving and braking mechanisms are designed and constructed in a simple and efficient manner without any complexity of rear wheel assembly. Further, since the driving and braking members are constructed such that repelling and driving forces caused thereby are active in the vicinity of the bearing member 13, such forces can be satisfactorily borne by same. This is desirable so as to afford effective protection of the driving and braking mechanisms. The distributed arrangement of the driving and braking members as described above ensures a well balanced design and layout of the whole structure of the vehicle.

Alternatively, both the driving member 24 and the braking members 25 and 26 may be disposed on only one side relative to the bearing member 13 of the rear shaft 18. This eliminates mounting of the driving and braking member on the opposite side, resulting in an increased height from the ground surface relative to the aforesaid other side of the rear axle. Moreover, the above described disc type braking device may be replaced with a drum type braking device. In this case, the brake drum and sprocket wheel may be constructed in an integrally united structure in accordance with the design and layout as described above.

Figure 6:
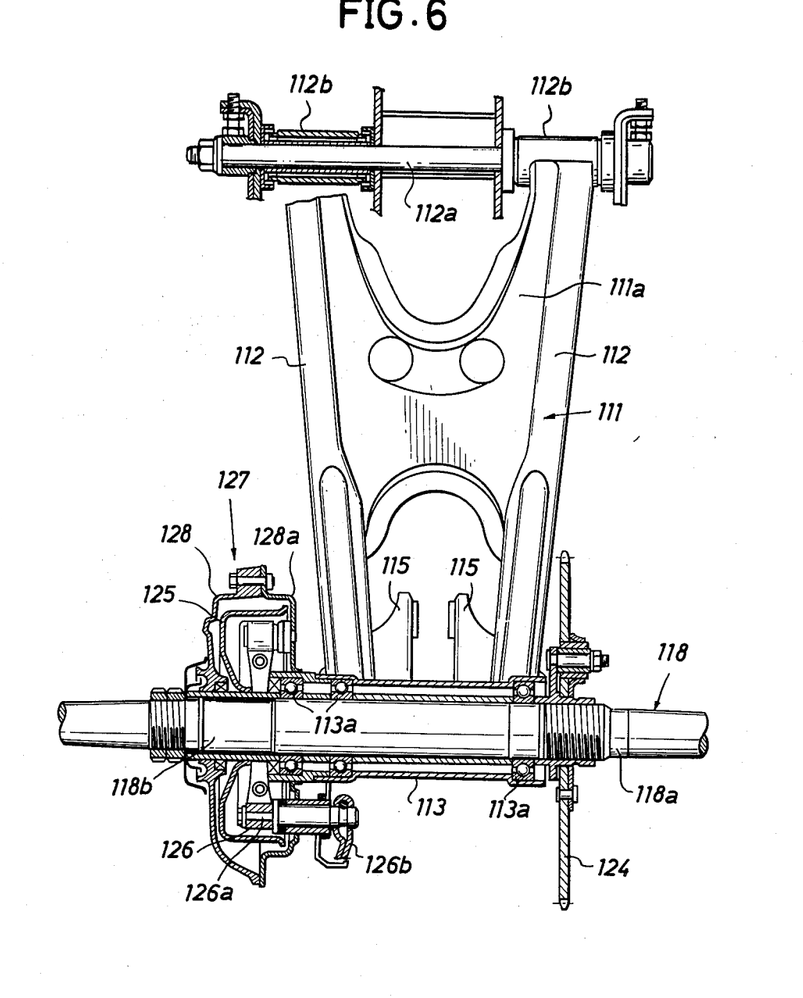
FIG. 6 is a typical example of a rear wheel assembly, shown in an enlarged scale.

FIG. 6 illustrates a typical example of a swing arm constructed in a manner similar to the above.

A swing arm generally designated by the reference numeral 111 comprises a pair of members 112 which are formed with respective collars 112b at their fore ends through which a shaft 112a extends in the transverse direction, whereby the swing arm 111 is pivotally secured to the frame structure by way of the shaft 112a. In an intermediate space between the members 112 there is provided a cross member 111a of press worked steel plate of which both side edges are fixed to the members 112. Further, the members 112 are provided at their rear ends with a rear axle bearing member 113 made of pipe or tube, the rear axle bearing member 113 being fixedly secured to the members 112. A pair of brackets 115 are mounted with their edges extending over and secured to respective rear portions of the members 112 and a circumferential portion of the rear axle bearing member 113 so that the above-described rear cushion unit is connected to the brackets 115 at its lower end. Thus, the rear cushion unit is resiliently suspended between the swing arm and the body frame.

Extending through the rear axle bearing member 113 is a rear axle 118 which is rotatably supported by means of bearings 113a arranged at both ends of the rear axle bearing member 113. The rear axle 118 has an extension 118a on one side of the rear axle bearing member 113 and a sprocket wheel 124 is fixedly mounted on the extension 118a. It is to be noted that the sprocket wheel 124 is disposed in as close a position as possible to the rear axle bearing member 113 in order to minimize the bending due to chain driving.

Further, the rear axle 118 has another extension 118b on the other side of the rear axle bearing member 113 on which a braking device is arranged. In this case, the braking device is a drum type braking device designated by the reference numeral 127 in the illustrated embodiment of the invention. The braking device 127 is disposed in position very close to the rear axle bearing member 113, similar to the sprocket wheel 124. A braking drum 125 is fixedly mounted to the rear axle extension 118b, while a housing 128 is fixedly secured to this end of the rear axle bearing member 113 in such a manner that the rear axle is rotatable in the housing 128. A brake shoe 126 is secured to a side wall 128a of the housing 128 and a pin 126a engages the brake shoe 126, the pin 126a having an extension to which a lever 126b is connected. The lever 126b is operated by means of a brake cable or the like means.

The body frame in accordance with the embodiments of the invention described above is designed in the form of a double cradle, but it may be designed in a diamond configuration wherein the intermediate part of the down tubes 5 is replaced with the body of the engine itself so that the latter forms a part of the frame structure. Further, in the illustrated embodiments the frame structure and the swing arm are constructed of pipe material but this material may be replaced by steel plates which are subjected to press working.

As described hereinabove, the rear axle 18 has the sprocket wheel 24 fixedly mounted thereon so that it is driven by means of a chain type driving mechanism. Usually a bicycle has a narrow spacing between two fork members of a rear fork structure which corresponds to the swing arm 11 and includes no member which corresponds to the rear axle bearing member 13. For such bicycle, chain adjustment is performed in such a manner that a rear axle is displaced forwardly or rearwardly within an elongated hole which is formed at rear ends of the rear fork structure in the longitudinal direction. However, there is no possibility of employing the above described manner of chain adjustment in a tricycle, because of the rear axle bearing member 13 fixed to the members 12 of the swing arm 11. Further, because the rear axle 18 has a long length in order to carry two rear wheels thereon, it is practically impossible to perform a chain adjustment by way of the step of displacing the rear axle 18 forwardly or rearwardly irrespective of the arrangement that the sprocket wheel 24 is mounted on the rear axle 18.

Thus, in order to realize the above-described possibility of performing the chain adjustment by way of displacing the rear wheel assembly forwardly or rearwardly, the following arrangement is proposed in accordance with the present invention.

Figure 7:
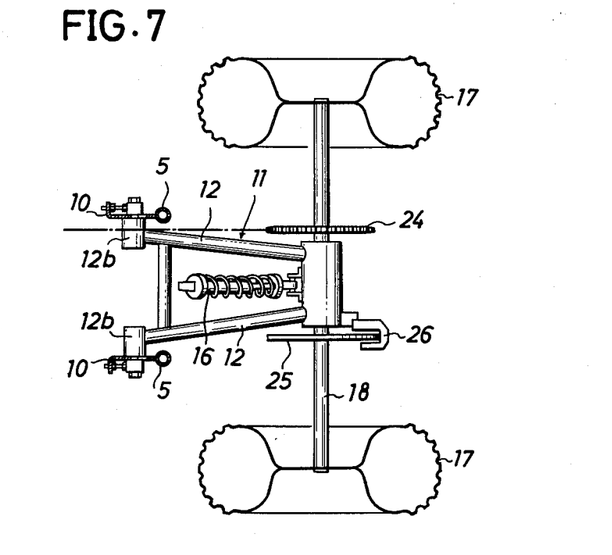
FIG. 7 is a partial plan view of a rear wheel assembly with a chain adjustment mechanism attached thereto.
Figure 8:
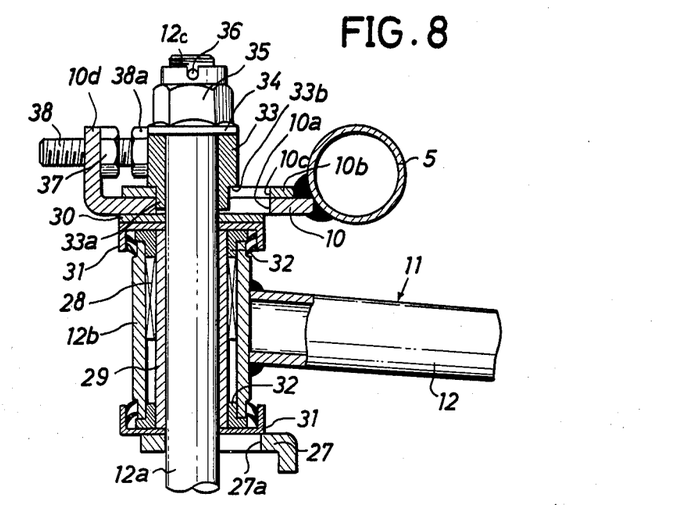
FIG. 8 is a sectional plan view of a portion of the chain adjustment mechanism, shown in an enlarged scale.
Figure 9:
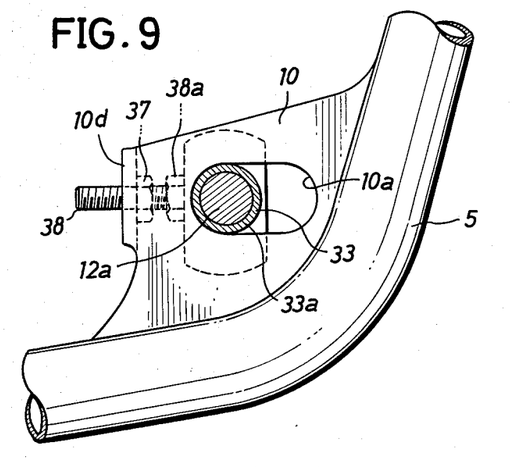
FIG. 9 is a side view of the portion shown in FIG. 8.

FIGS. 7 to 9 illustrate an embodiment for fulfilling such requirement. Each of the two brackets 10 disposed at lower positions on the down tubes 5 is formed with an elongated hole 10a extending in the longitudinal direction, as best seen in FIG. 9. Each bracket 10 is adapted to pivotally support the front end of either member 12 of the swing arm 11 by means of the shaft 12a and the collar 12b. On the opposite side of the bracket 10 with respect to the collar 12b, there is provided a support plate 27 secured to a suitable position on the vehicle in a conventional manner and formed with an elongated hole 27a which is aligned with the elongated hole 10a. Provided through both elongated holes 10a and 27a is the shaft 12a, which may preferably be extended between the two members 12a of the swing arm 11 as shown in FIG. 8. The collar 12b is rotatably fitted on the shaft 12a with a bearing 28 and a spacing collar 29 provided therebetween. Further, between one end of the collar 12b and the bracket 10 as well as between the other end of the collar 12b and the plate 27 are arranged side washers 30, dust seals 31 and bushes 32.

The shaft 12a has an extension on the outside of the bracket 10, the extension having a side collar 33 fitted thereon. This side collar 33 is formed with a stepped portion 33a which has a diameter smaller than that of the collar 33, the stepped portion 33a being fitted in the elongated hole 10a with its shoulder 33b being brought in contact with the outside surface of the bracket 10. In the illustrated embodiment the bracket 10 has a reinforcement plate 10b disposed outside the former, the reinforcement plate 10b being formed with an elongated hole 10c which has the same configuration and dimensions as those of the aforesaid elongated hole 10a, and the stepped portion 33a is fitted in both of the holes 10a and 10c with the shoulder 33b in contact with the outside surface of the reinforcement plate 10b. The shaft 12a is formed with a threaded portion 12c at its protruded end portion and a nut 35 is screwed on the threaded portion 12c together with a washer 34. Upon screwing the nut 35, the collar 33 advances along the shaft 12a toward the bracket 10. In FIG. 8, reference numeral 36 designates a lock pin which serves for preventing free rotation of the nut 35.

As shown in FIG. 8, the bracket 10 is formed with a support piece 10d at its fore end which has an outwardly extending bent portion. A locknut 37 is disposed behind the bent portion and a chain tension adjustment bolt 38 is extended through the bent portion and then is screwed through the locknut 37, until its head portion 38a abuts against the side wall of the collar 33.

Referring to FIGS. 8 and 9, the rear wheel assembly is disposed on the right, whereas the frame structure is disposed on the left. When swing arm 11 is urged to the left, that is, in the forward direction by means of the chain mechanism, the shaft 12a is preferably locked in the illustrated position by way of the abutment of the head portion 38a of the bolt 38 against the side wall of the collar 33.

As the chain tension becomes low, it is necessary to properly adjust the bolt 38. When performing correction, the lock pin 36 is first disconnected, then the nut 35 is unscrewed before the adjustment of the bolt 38. As a result, the adjustment bolt 38 is displaced in the rightward direction. This causes the collar 33 to move in the rightward direction with the result that the shaft 12a is displaced in the rearward direction, while being guided in the elongated holes 10a and 10c and at the same time the collar 12b pivotally fitted on the shaft 12a moves together with the member 12 of the swing arm 11. Thus, the rear axle 18 at the rear end of the swing arm 11 moves rearwardly together with the sprocket wheel 24 fixedly mounted thereon, whereby the chain tension is increased. After completion of the above correction, the nut 35 is tightened so as to urge the collar 33 against the bracket 10 and then the lock pin 36 is driven into the portion 12c to lock the nut 35. Then, the pin 36 is fixed at the corrected position in cooperation with the adjustment bolt 38 and thereby the proper chain tension may be maintained.

Figure 10:
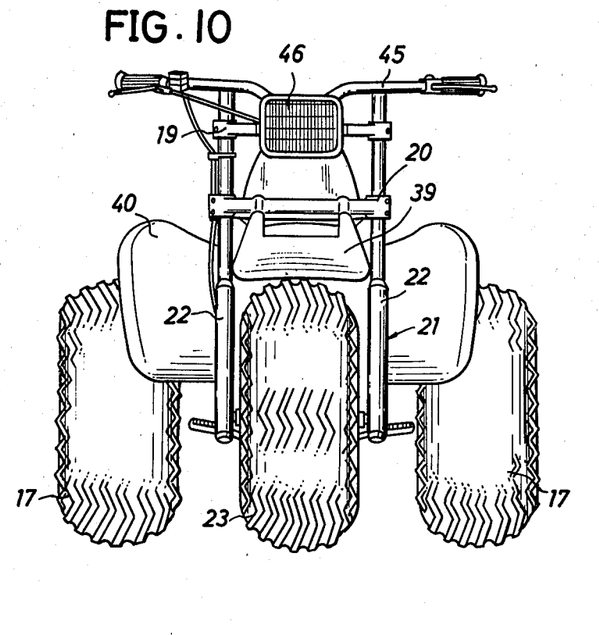
Figure 11:
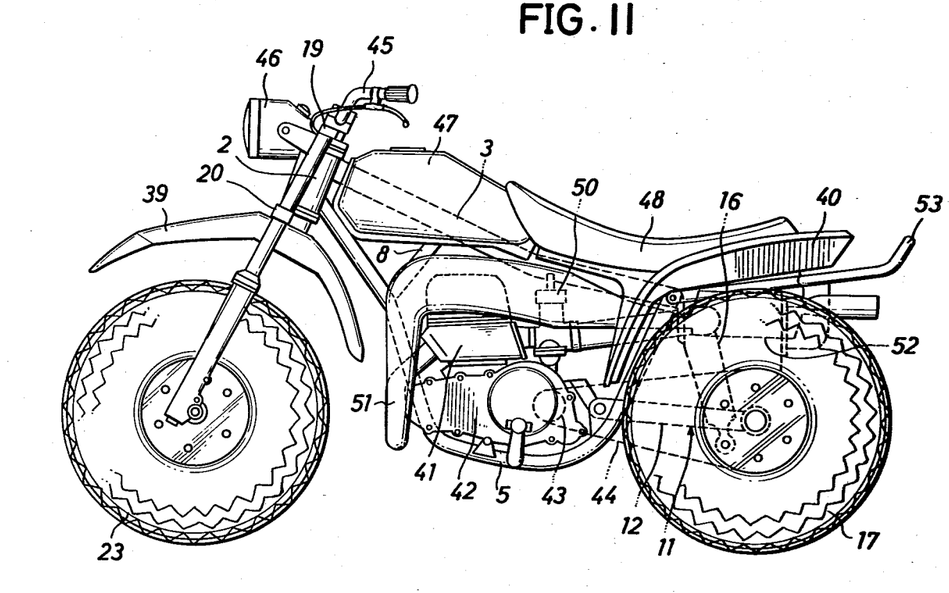
FIG. 11 is a side view and FIG. 12 is a plan view of the tricycle.
Figure 12:
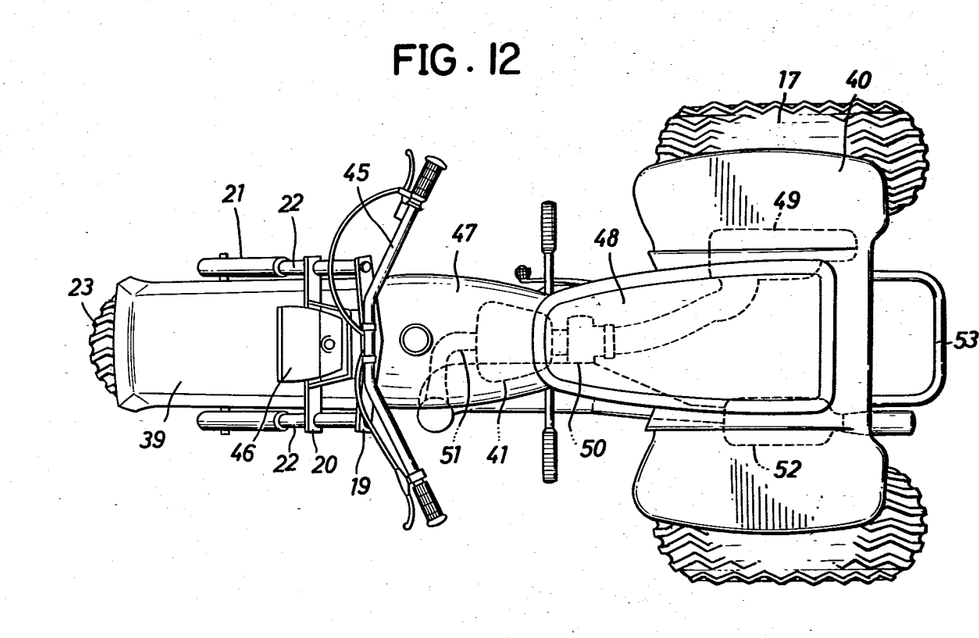

FIGS. 10 to 12 are outline drawings of the tricycle in accordance with the present invention. Both the front wheel 23 and rear wheels 17 are partially covered with respective fenders 39 and 40. In the space between the down tubes 5 and the main frame member 3, there is mounted an engine 41 and a power transmission case 42. The power transmission case 42 contains a driving sprocket wheel 43 on the rear side thereof, the driving sprocket wheel 43 being in operative connection with the driven sprocket wheel 24 by way of a line of chain 44, so that the rear axle 18 is rotated and thereby the rear wheels 17 are driven. Disposed above the upper bridge 19 is a steering handle bar 45 made of a pipe material and in front of the steering handle bar 45 is mounted a head light 46. Behind the steering handle bar 45, above the main frame member 3, there is mounted a fuel tank 47 and behind the fuel tank 47 is mounted a driver's seat 48. It is to be noted that in the drawings reference numeral 49 designates an air cleaner, reference numeral 50 designates a carburetor, reference numeral 51 designates an exhaust pipe, reference numeral 52 designates a muffler and reference numeral 53 designates a rear guard member.

The present invention has been described hereinabove with reference to a few preferred embodiments of the invention. It should of course be understood that the invention is not limited only to these embodiments and change or modification may be made therein in a suitable manner without any departure from the spirit and scope of the invention.

What is claimed is:

1. A vehicle with at least one front wheel and two rear wheels, comprising:
   a frame structure;
   a swing arm having two members extending rearwardly from said frame structure and a rear axle bearing member connected between rear ends of said two members, said rear axle bearing member supporting a rear axle for said rear wheels;
   at least one rear cushion unit;
   said rear cushion unit being interposed between said frame structure and said swing arm; and
   said rear axle bearing member being disposed substantially centrally between said rear wheels and having the length dimension thereof extending substantially in the transverse direction of said vehicle.

2. A vehicle according to claim 1, wherein:
   only one of said front wheels is provided; and
   said joint member (3) connects a main frame member (3) of said frame structure and a plurality of sub-members of said frame structure, said sub-members supporting an engine.

3. A vehicle according to claim 2, wherein:
   said main frame member comprises a backbone frame of said frame structure;
   said joint member is provided in the transverse direction of said vehicle; and
   said backbone frame and said sub-members have their rear ends secured to said joint member.

4. A vehicle according to claim 1, wherein said rear cushion unit has one end thereof supported by said swing arm at a position forwardly of said rear axle.

5. A vehicle with at least one front wheel and two rear wheels, comprising:

a frame structure;
a swing arm having two members extending rearwardly from said frame structure;
said swing arm having its rear end provided with a rear axle bearing member supporting a rear axle for said rear wheels;
only one rear cushion unit;
said rear cushion unit being interposed between a joint member of said frame structure and said rear axle bearing member; and
said rear cushion unit having one end thereof supported at a position axially rearward of a main frame member of said frame structure and another end thereof supported by said swing arm at a central position in the axial direction of said rear axle.

6. A vehicle with at least one front wheel and two rear wheels, comprising:
a frame structure;
a swing arm having two members extending rearwardly from said frame structure;
said swing arm having its rear end provided with a rear axle bearing member supporting a rear axle for said rear wheels;
at least one rear cushion unit;
said rear cushion unit being interposed between a joint member of said frame structure and said rear axle bearing member; and
said members of said swing arm having their rear ends spaced apart from each other in the transverse direction of said vehicle and closed with said rear axle bearing member secured to said rear ends of said members of said swing arm.

7. A vehicle according to claim 6, wherein said rear wheels are secured respectively to either end of said rear axle, and said rear axle extends through said rear axle bearing member and has one extension thereof extended on either side of said rear axle bearing member and provided with either a driven means or a braking device.

8. A vehicle according to claim 7, wherein said rear axle has another extension extended on the opposite side of said rear axle bearing member with respect to said one extension and provided with either said driven means or said braking device.

9. A vehicle according to claim 6, wherein said members of said swing arm have their front portions closed with a cross member extending transversely therebetween and secured thereto at either end.

10. A vehicle according to claim 7 or 8, wherein:
said driven means is driven by means of a chain;
said frame structure has a plurality of support means secured thereto and formed with elongated holes;
said members of said swing arm have their front ends provided with pivotal portions; and
said pivotal portions are secured to said support means so as to be adjustable in position in the longitudinal direction of said vehicle along with said elongated holes, so that said driven means is adjustable in position in the longitudinal direction of said vehicle.

* * * * *